United States Patent [19]
Kawa et al.

[11] Patent Number: 6,002,796
[45] Date of Patent: *Dec. 14, 1999

[54] VIDEO SIGNAL COMPRESSION APPARATUS UTILIZING MULTIPLE COMPRESSION RATIOS

[75] Inventors: Seiji Kawa; Fumihiko Sudo; Taku Kihara, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/574,520

[22] Filed: Dec. 19, 1995

[30] Foreign Application Priority Data

Dec. 26, 1994 [JP] Japan .................................. 6-338234

[51] Int. Cl.[6] ...................................................... G26K 9/36
[52] U.S. Cl. ........................................... 382/168; 382/232
[58] Field of Search ..................................... 382/168, 232, 382/242; 358/426, 261.1–261.4; 348/568

[56] References Cited

U.S. PATENT DOCUMENTS 5,339,368  8/1994  Higgins-Luthman et al. ........... 382/56
5,357,279  10/1994  Nakamura et al. ...................... 348/207
5,633,511  5/1997  Lee et al. ................................. 250/587

FOREIGN PATENT DOCUMENTS 0 529 635 A2  3/1993  European Pat. Off. .
0 613 294 A1  8/1994  European Pat. Off. .
42 37 420 A1  7/1993  Germany .

OTHER PUBLICATIONS

Blom et al: "Adaptive Highlight Compression In Today's CCD" SMPTE Journal., vol. 101, No. 3, Mar. 1992, US, pp. 135–139, XP000263827.

*Primary Examiner*—Thomas D. Lee
*Assistant Examiner*—Stephen Brinich
*Attorney, Agent, or Firm*—Frommer Lawrence & Haug, LLP.; William S. Frommer

[57] ABSTRACT

Video signal compression apparatus for analyzing an input video signal to determine the distribution of signal levels and compressing the input signal as a function of the distribution to produce an output video signal.

31 Claims, 4 Drawing Sheets

VIDEO SIGNAL COMPRESSION APPARATUS UTILIZING MULTIPLE COMPRESSION RATIOS

BACKGROUND OF THE INVENTION

The present invention relates to a video signal compression apparatus for compressing component portions of a video signal according to compression ratios specific to each component which depend upon the frequency with which the particular component appears in the video signal.

During ordinary operation of a video camera system, the quantity of light incident upon the imaging device varies by several orders of magnitude. To facilitate the storage and reproduction of images comprised of such a range of light intensities, video signal compression techniques are employed to reduce the amount of information needed to represent such images.

In the art, an apparatus for compressing the intensity or luminance level of a video signal is referred to as a "knee circuit." Several examples of prior art knee circuits are described in U.S. Pat. No. 5,357,279, Nakamura et al., which is also assigned to the assignee of the present application. Typically, a knee circuit processes an input video signal according to the fixed transfer function illustrated in FIG. 1. According to this function, output video level varies with input video level at a first constant rate until the single "knee point" is reached. The "knee point" is simply the input video level at which the transfer function changes. After the knee point, output video level varies with input video level at a second constant rate, wherein the second constant rate is less than the first constant rate.

Upon study it has been determined that the frequency with which a particular input video level occurs is not necessarily proportional to the input video level. For example, as illustrated in the histogram of FIG. 2, the distribution of input video levels may be generally concentrated around two particular input video signal levels. In this figure, the y-axis represents the number of occurrences while the x-axis represents input video intensity level. The number of occurrences preferably refers to the number of imaging elements, e.g. pixels, which register a particular intensity or luminance level in a given input image.

Application of the fixed transfer function described above to the input image represented by FIG. 2 clearly yields an inefficient allocation of the output video signal. According to such a compression scheme, input video levels are compressed at one of two different rates regardless of the actual frequency with which a particular input video level occurs. Consequently, some input video levels are unnecessarily excessively compressed while other input video levels are allocated too much of the output video signal and thus are compressed by a less than optimum amount.

OBJECTS AND SUMMARY OF THE INVENTION

Therefore, an object of the present invention is to provide video signal compression apparatus utilizing multiple compression ratios for compressing different input video levels differing amounts.

It is an additional object of the present invention to provide video signal compression apparatus for analyzing an input video signal to determine the frequency with which a particular input video level occurs.

Another object of the present invention is to provide video signal compression apparatus for allocating the output video signal according to the frequency with which a particular input video level occurs.

A further object of the present invention is to provide video signal compression apparatus which adapts the allocation of the output video signal to the distribution of signal intensity or luminance of the input video signal.

Still another object of the present invention is to provide video compression apparatus which allocates a greater amount of an output video signal to components of an input video signal which occur more often than other components of the input video signal.

In accordance with an aspect of the present invention, a video signal compression apparatus for compressing an input video signal having multiple signal levels to produce an output video signal having multiple signal levels is provided. A device receives the input video signal and an analyzing device analyzes the input video signal to determine the distribution of signal levels present in the input video signal. A signal compression device compresses the input video signal as a function of the distribution to produce the output video signal.

In accordance with another aspect of the present invention, a video signal compression apparatus for compressing an input video signal having multiple signal levels to produce an output video signal is provided. A device receives the input video signal and a signal compression device compresses the input video signal as a function of the signal levels of the input video signal. The input video signal is compressed according to at least three different compression functions to produce the output video signal.

In accordance with a further aspect of the present invention, a camera system is provided that includes an imaging device for acquiring an image signal having multiple luminance levels and a signal compression device for compressing the image signal as a function of the luminance levels such that the image signal is compressed according to at least three different compression functions to produce a video signal.

Other objects, features, and advantages according to the present invention will become apparent from the following detailed description of illustrated embodiments when read in conjunction with the accompanying drawings in which the same components are identified by the same reference numerals.

DETAILED DESCRIPTION OF THE PREFERRED EMBODIMENTS

According to an embodiment of the present invention, a video compression apparatus analyzes an input video signal and configures itself to adjust the compression of different signal components of the input video signal in an effort to exploit particular characteristics of the input video signal. A representation of such an adaptive compression technique is provided in FIG. 3.

Figure 1:
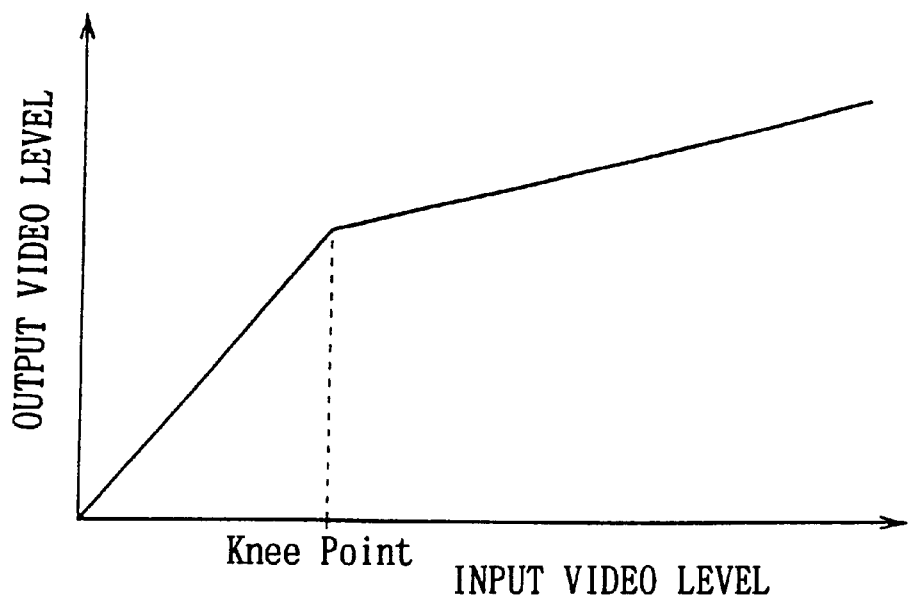
FIG. 1 is a graph of output video level versus input video level characteristic of the dual compression rates utilized in the prior art.
Figure 2:
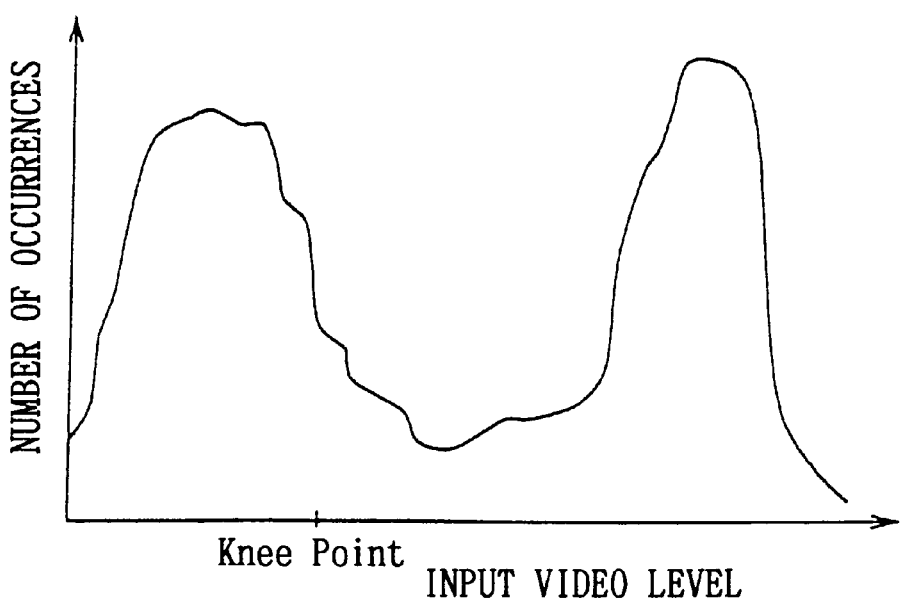
FIG. 2 is a histogram of the video levels of an input video image.
Figure 3:
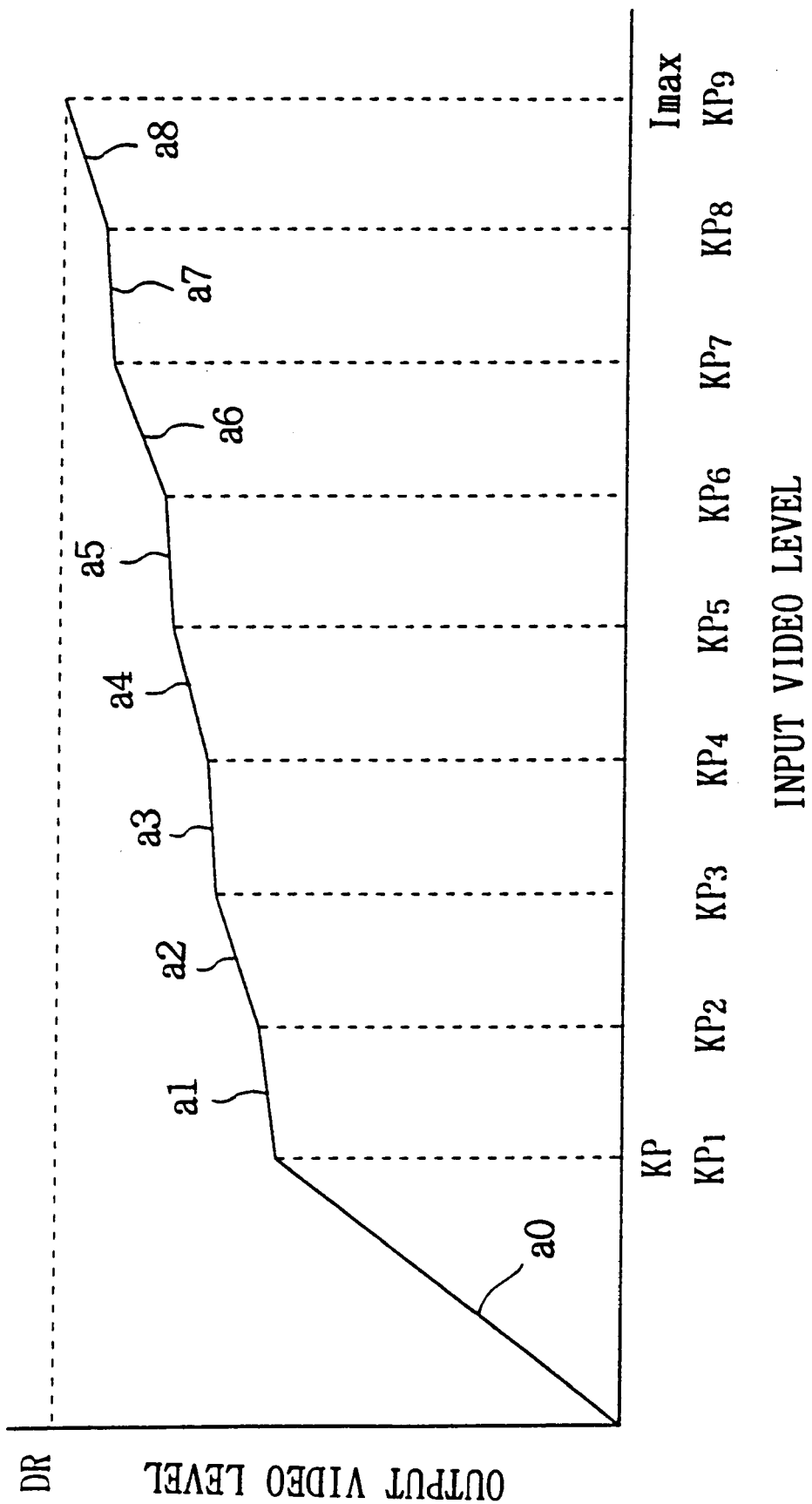
FIG. 3 is a graph of output video level versus input video level according to an embodiment of the present invention.

FIG. 3 illustrates an example of a transform function in which output video level varies according to several different rates with respect to the input video level. Here, "video level" refers to signal intensity, luminance, tone, power, strength or any similar characterization of a video signal. As depicted, the output video signal can range between zero and DR, the maximum dynamic range of the signal. The piecewise linear transform function extends between an input video level of zero and $I_{max}$, the maximum intensity level, and is comprised of nine line segments, each having its own constant slope $a_0, a_1, a_2, \ldots a_8$. Each of the line segments beyond the first is delineated by two knee points (KP's), such that in general, knee points $KP_i$ and $KP_{i+1}$ define a line segment having a slope of $a_i$, i being an integer variable between one and k, the number of line segments. The line segment of slope $a_0$ extends between a given point on the output video level axis and $KP_1$, also referred to simply as KP.

Each of the slopes $a_i$ represents the particular amount of video signal compression to be applied to input video signals having levels in the range of $KP_i$ to $KP_{i+1}$. By compressing different components of the input video signal at different rates, a more efficient allocation of the output video signal can be achieved. Allocation of the output signal among constituent components of the input video signal and determination of the amount each component is to be compressed will be described in greater detail in the following.

It should be noted that although the transform function is depicted as an increasing function divided into nine segments, the invention is not limited to this specific example. As will be appreciated by one of ordinary skill in the art, the transform function may be comprised of any number of segments, each having its own slope which is different from that of immediately adjacent segments, i.e. $a_0, a_1, \ldots a_k$. Further, the transfer function may be entirely or partly decreasing, that is, one or more of the slopes $a_i$ may be negative.

By construing the transfer function in the preceding manner, it is possible to relate the slope of each segment to the frequency with which the corresponding input video levels are found in the input video signal. For example, if it is assumed that the value of slope $a_0$ equals one and that there are a total of k segments, then the dynamic range DR of the output video signal can be expressed as:

$$KP + a_1 \cdot \frac{I_{max} - KP}{k} + a_2 \cdot \frac{I_{max} - KP}{k} + \qquad (1)$$
$$a_3 \cdot \frac{I_{max} - KP}{k} + \ldots + a_k \cdot \frac{I_{max} - KP}{k} = DR$$

Simplifying this equation produces:

$$\frac{I_{max} - KP}{k} \sum_{i=1}^{k} a_i = DR - KP \qquad (2)$$

By rearranging the above equation, an expression for the sum of all of the slopes $a_i$ takes the following form:

$$\sum_{i=1}^{k} a_i = (DR - KP) \cdot \frac{k}{I_{max} - KP} \qquad (3)$$

In the preferred embodiment, each slope $a_i$ of each segment, and consequently the degree to which the corresponding components of the input video signal are compressed, is allocated in direct proportion to the frequency with which the components of the input video signal fall within the range of levels $KP_i$ to $KP_{i+1}$. Defining the quantity hi as the number of components of the input video signal having a level in the range $KP_i$ to $KP_{i+1}$, the slope $a_i$ is allocated such that:

$$a_i = \frac{h_i}{\sum_{i=1}^{k} h_i} \cdot \sum_{i=1}^{k} a_i \qquad (4)$$

Substituting equation (4) into equation (3), the slope $a_i$ can be expressed as:

$$a_i = \frac{h_i}{\sum_{i=1}^{k} h_i} \cdot (DR - KP) \cdot \frac{k}{I_{max} - KP} \qquad (5)$$

To complete the definition of each segment having a slope $a_i$, the y-intercept, $b_i$, of the segment, that is, the point on the output video level axis at which a line extending through that segment intersects the output video level axis, is determined. Preferably it is assumed that the segment having a slope $a_0$ has a y-intercept $b_0$ of zero ($b_0=0$). Based upon this assumption, the y-intercepts $b_i$ of the other segments can be expressed as:

$$b_i = KP_i(a_{i-1} - a_i) + b_{i-1} \qquad (6)$$

With the values of $a_i$ and $b_i$ calculated for each segment, the appropriate amount of compression for each corresponding component of the input video signal can be obtained. In this manner, the dynamic range of the output video signal is allocated according to the signal level histogram of the input video signal.

While the above-described calculation is the preferred manner of allocating the dynamic range of the output video signal, it will be appreciated by one of ordinary skill that numerous variations upon this approach fall within the scope of the present invention. For example, a similar calculation is possible without assuming a value for slope $a_0$ or by assuming a different value.

Figure 4:
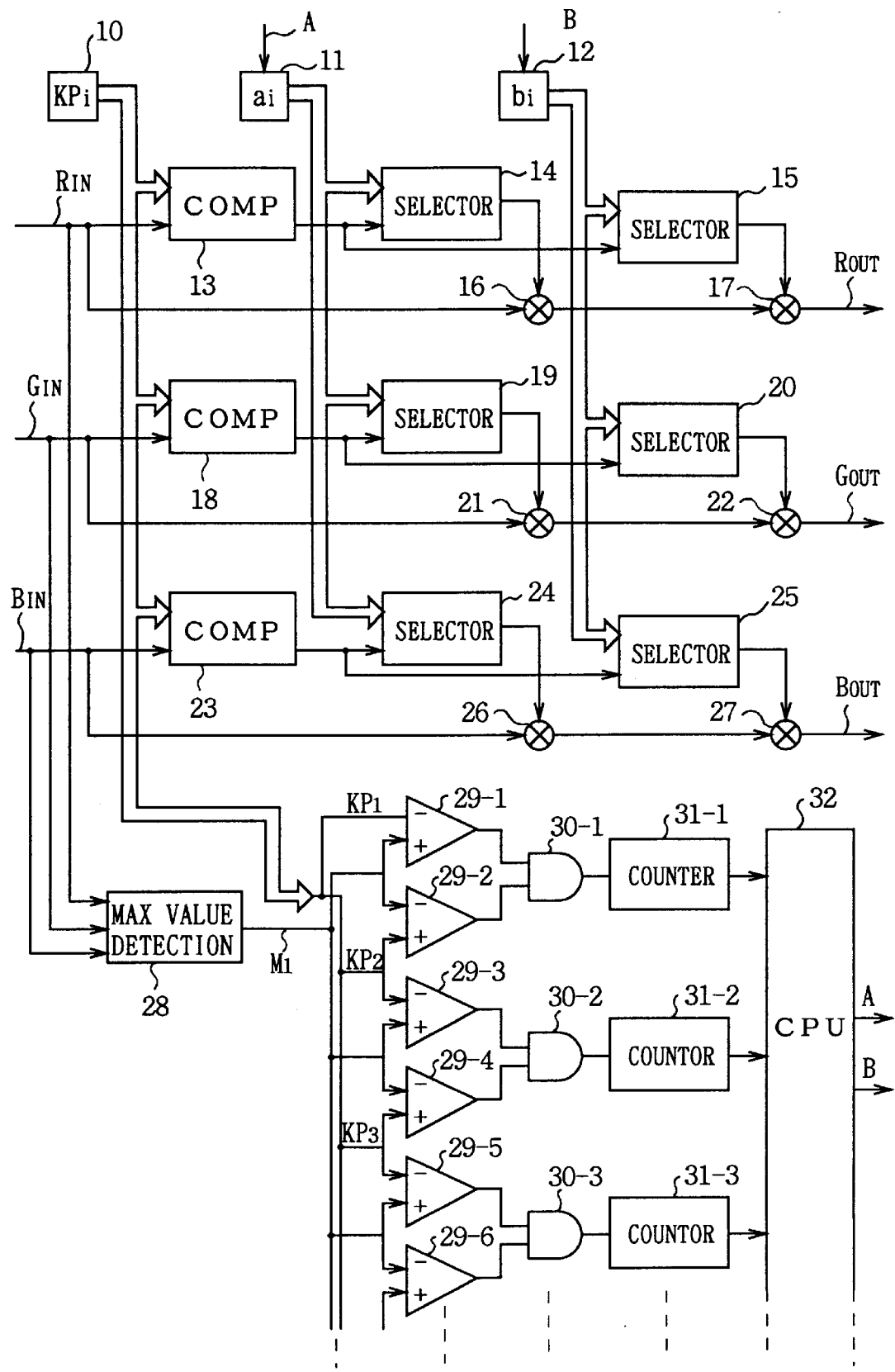
FIG. 4 is knee circuit according to an embodiment of the present invention.

A knee circuit implementing the above-described method of allocating the output video signal is illustrated in FIG. 4. This knee circuit is comprised of knee-point memory 10; slope memory 11; intercept memory 12; multiple-comparator units 13, 18, and 23; slope selectors 14, 19, and 24; intercept selectors 15, 20, and 25; multipliers 16, 21, and 26; adders 17, 22, and 27; maximum value detector 28; comparators 29-1, 29-2, . . . 29-(2k-2); AND gates 30-1, 30-2, . . . 30-(k-1); counters 31-1, 31-2,...31-(k-1); and CPU 32. In general, maximum value detector 28, comparators 29-1, . . . 29-(2k-2), AND gates 30-1, . . . 30-(k-1), counters 31-1, . . . 31-(k-1), and CPU 32 operate together to determine the distribution of signal levels of the input video signal, e.g. a histogram of the signal, on a real time, frame-by-frame, field-by-field or like basis. The remainder of the knee circuit operates to process that input video signal or the next input video signal as a function of the histogram which has been determined.

An input digital signal, formed of three components $R_{IN}$, $G_{IN}$, and $B_{IN}$, are supplied to maximum value detector 28. The detector passes the signal component having the greatest level to comparators 29-1, . . . 29-(2k-2) as signal $M_1$. As before, "level" refers to signal intensity, luminance, tone, power, strength or any similar characterization of a video signal. Alternatively, the maximum value detector may pass the signal component having the greatest average level over a period of time, or apply some other similar criteria in selecting the signal component to be passed. As another alternative, the maximum value detector 28 may be replaced by an adding circuit which combines the three components $R_{IN}$, $G_{IN}$, and $B_{IN}$ by straight addition, by a weighted combination such as $(0.3R_{IN}+0.6G_{IN}+0.1B_{IN})$ corresponding to a brightness signal, or by some other conventional RGB signal combining method and which supplies the three component combination to the comparators as signal $M_1$.

Knee-point memory 10 is preset with a predetermined number of signal level values corresponding to knee points $KP_i$ which will be used to divide the input signal into ranges of input signal levels. Knee-point memory 10 supplies individual knee point values to comparators 29-1, . . . 29-(2k-2). Since the exact number of knee points "k" will depend upon the particular application, the comparators, AND gates, and counters are illustrated as a repeating structure. In general, there will be (2k-2) comparators 29-(i), (k-1) AND gates 30-(i), and (k-1) counters 31-(i).

The comparators and the AND gates are configured to isolate specific ranges of signal levels of the $M_1$ signal supplied by maximum value detector 28. Comparators 29-1 and 29-2 supply a logic one output signal to AND gate 30-1 if $M_1$ falls between $KP_1$ and $KP_2$. Comparators 29-3 and 29-4 supply a logic one output signal to AND gate 30-2 if $M_1$ falls between $KP_2$ and $KP_3$. In similar fashion, comparators 29-5 and 29-6 supply a logic one output signal to AND gate 30-3 if $M_1$ falls between $KP_3$ and $KP_4$. Should $M_1$ fall outside a range defined by two knee points, one of the comparators will supply a logic zero output signal to the corresponding AND gate.

The supply of two logic one signals to the inputs of AND gate 30-1 causes it to supply a logic one signal to the corresponding counter 31-1 causing it to increment its running count. AND gates 30-2, . . . 30-(k-1) in conjunction with counters 31-2, . . . 31-(k-1), respectively, operate in a similar manner. Each of the counters 31-1, . . . 31-(k-1) counts the number of times signal $M_1$ contains a component within one of the given ranges of levels. Collectively, the counters produce a histogram of signal $M_1$. Following the end of signal $M_1$ or some subdivision thereof, such as the end of a scan line, a field, a frame, or the like, CPU 32 receives from each of the counters the current count stored therein. The counters are then reset.

CPU 32 thus obtains the histogram of signal $M_1$ divided into ranges defined by the knee points $KP_i$. Using equations (5) and (6) provided above, CPU 32 calculates a slope a and an intercept b for each of the (k-1) ranges and outputs these as signals A and B, respectively. Signal A loads slope memory 11 with each of the slopes $a_i$ while signal B loads intercept memory 12 with each of the intercepts $b_i$.

The three components $R_{IN}$, $G_{IN}$, and $B_{IN}$ are also supplied to each of multiple-comparator units 13, 18, and 23, respectively, and to each of multipliers 16, 21, and 26, respectively. In the interest of brevity, only the processing of signal $R_{IN}$ will be described in detail as the processing of signals $G_{IN}$, and $B_{IN}$ are substantially the same as the processing of signal $R_{IN}$. Multiple-comparator unit 13 serves to categorize the levels of signal $R_{IN}$ as portions of the signal are input with respect to knee points $KP_i$, e.g. unit 13 determines between which two knee points each portion of the input signal belongs. For example, unit 13 can be configured in a manner similar to that of comparators 29-1, . . . 29-(2k-2) in conjunction with AND gates 30-1, . . . 30-(k-1).

Comparator unit 13 supplies its categorization i to slope selector 14 and intercept selector 15. Slope selector 14 uses the quantity i to access the corresponding slope $a_i$ stored in slope memory 11 and supplies slope $a_i$ to multiplier 16. Intercept selector 15 uses the quantity i to access the corresponding intercept $b_i$ stored in intercept memory 12 and supplies intercept $b_i$ to adder 17.

Multiplier 16 multiplies the particular portion of signal $R_{IN}$ by slope $a_i$ and supplies the product to adder 17. Adder 17 adds $b_i$ to this product to produce a sum which is output as output signal $R_{OUT}$. In an analogous manner, output signals $G_{OUT}$ and $B_{OUT}$ are formed. According to this method, the dynamic range of the output signal is allocated to the corresponding input signal according to a histogram of the input signal.

Figure 5:
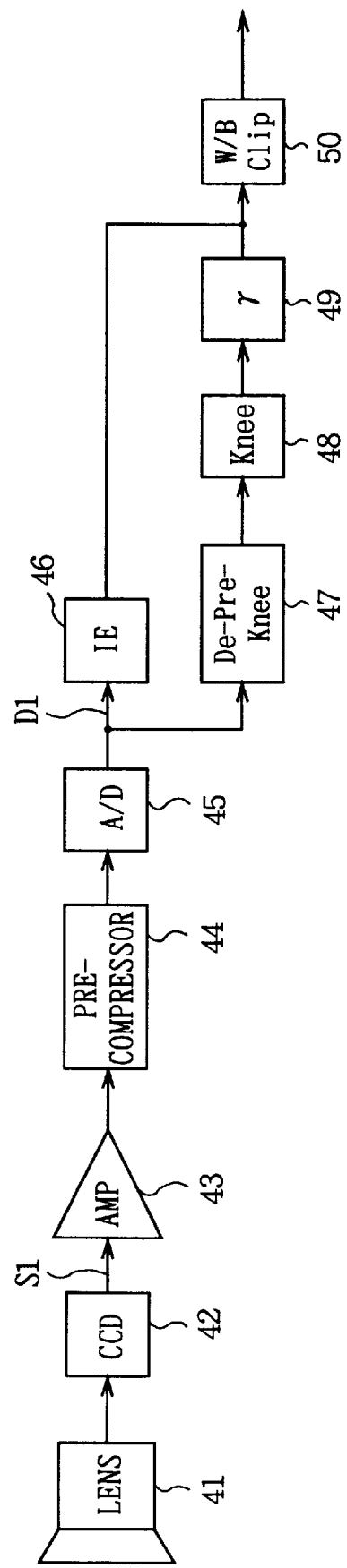
FIG. 5 is a CCD camera system embodying a knee circuit according to the present invention.

A useful application of the video signal compression apparatus of the present invention is illustrated in FIG. 5, a charge-coupled device (CCD) camera system. The CCD camera system is comprised of a lens 41, CCD 42, amplifier 43, pre-compressor 44, analog-to-digital (A/D) converter 45, image enhancer 46, decompressor 47, knee circuit 48, gamma corrector 49, and black/white clipper 50. Lens 41 focusses incident light from an image upon CCD 42. CCD 42 develops video signal S1 representative of the incident light and supplies video signal S1 to amplifier 43. Amplifier 43 transmits an amplified video signal S1 to pre-compressor 44.

Pre-compressor 44, along with its counterpart decompressor 47, are conventional devices for compressing and decompressing, respectively, the luminance portion of video signal S1. For example, pre-compressor 44 may be a prior art knee circuit. Pre-compressor 44 preferably compresses the "high" luminance portion of video signal S1, which originally may be beyond the range of a/d converter 45. After suitable compression, a/d converter 45 converts analog video signal S1 into digital video signal D1. Signal D1 is decompressed by decompressor 47 to reconstruct the luminance portion of video signal S1 in a digital format. Signal D1 is also processed by image enhancer 46 which preferably operates to "square off" abrupt variations in the incident light that are inherently filtered by CCD 42 and produces a detail signal.

Preferably, decompressor 47 decompresses the "high" luminance portion of signal D1 with an inverse of the method employed by pre-compressor 44. The decompressed signal is supplied to knee circuit 48 which compresses the signal according to the compression method of the present invention. Preferred construction and operation of knee circuit 48 have been described in connection with FIG. 4. Knee circuit 48 supplies the compressed signal to gamma circuit 49 for gamma correction. The gamma corrected signal is combined with the detail signal and the combined signal is supplied to black/white clipper 50. Black/white clipper 50 preferably "clips" the combined signal where it overextends either boundary of a given range of values, thus "clipping" the signal to the color black or the color white.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A video signal compression apparatus for compressing an input video signal having a first plurality of signal levels, to produce an output video signal having a second plurality of signal levels, said apparatus comprising:

means for receiving said input video signal;

analyzing means for analyzing said input video signal to determine a distribution of said first plurality of signal levels;

compression function generating means for generating a compression function, comprised of a plurality of linear function elements, in accordance with said distribution; and signal compression means for compressing said input video signal in accordance with said generated compression function to produce said output video signal.

2. Apparatus according to claim 1, wherein said analyzing means comprises histogram means for generating a histogram signal representative of a histogram of said first plurality of signal levels.

3. Apparatus according to claim 2, wherein said signal compression means compresses said input video signal in accordance with said generated compression function, which is generated as a function of said histogram signal.

4. Apparatus according to claim 2, wherein said histogram means comprises a plurality of comparators for comparing each of said first plurality of signal levels to a plurality of predetermined ranges of signal levels.

5. Apparatus according to claim 4, wherein said histogram means further comprises counting means for counting each of said first plurality of signal levels occurring in a predetermined range of signal levels.

6. Apparatus according to claim 2, wherein said input video signal comprises a plurality of component signals having signal levels and wherein said histogram means comprises:

maximum signal level detecting means for detecting a component signal having a maximum signal level;

a plurality of comparators for comparing the signal levels of said component signal to a plurality of predetermined ranges of signal levels; and counting means for counting the signal levels of said component signal occurring in each of said plurality of predetermined ranges of signal levels.

7. Apparatus according to claim 1, wherein said signal compression means compresses said input video signal according to at least three different component compression functions.

8. Apparatus according to claim 7, wherein the component compression functions are linear.

9. Apparatus according to claim 1, wherein said input video signal has a greater dynamic range than said output video signal.

10. Apparatus according to claim 1, wherein the first and second pluralities of signal levels are intensity levels.

11. Apparatus according to claim 1, wherein the first and second pluralities of signal levels are luminance levels.

12. Apparatus according to claim 1, wherein the first and second pluralities of signal levels are tone levels.

13. Apparatus according to claim 1, wherein the first and second pluralities of signal levels are power levels.

14. Apparatus according to claim 1, wherein the first and second pluralities of signal levels are signal strength levels.

15. A video signal compression apparatus for compressing an input video signal having a first plurality of signal levels, to produce an output video signal, said apparatus comprising:

means for receiving said input video signal;

compression function generating means for generating a compression function, comprised of a plurality of linear function elements, in accordance with said first plurality of signal levels; and signal compression means for compressing said input video signal in accordance with said compression function such that said input video signal is compressed according to at least three different component compression functions to produce said output video signal.

16. Apparatus according to claim 15, wherein said function depends upon the frequency with which said input video signal attains a predetermined level.

17. Apparatus according to claim 15, wherein said function depends upon the frequency with which said input video signal attains a plurality of predetermined levels.

18. Apparatus according to claim 15, wherein the component compression functions are linear.

19. Apparatus according to claim 15, wherein said input video signal has a greater dynamic range than said output video signal.

20. Apparatus according to claim 15, wherein said first plurality of signal levels are intensity levels.

21. Apparatus according to claim 15, wherein said first plurality of signal levels are luminance levels.

22. Apparatus according to claim 15, wherein said first plurality of signal levels are tone levels.

23. Apparatus according to claim 15, wherein said first plurality of signal levels are power levels.

24. Apparatus according to claim 15, wherein said first plurality of signal levels are signal strength levels.

25. A camera system comprising:

imaging means for acquiring an image signal having a plurality of luminance levels;

compression function generating means for generating a compression function, comprised of a plurality of linear function elements, in accordance with said plurality of luminance levels; and signal compression means for compressing said image signal as a function of said compression function such that said image signal is compressed according to at least three different component compression functions to produce a video signal.

26. A system according to claim 25, wherein the component compression functions are linear.

27. A video signal compression apparatus for compressing a first input video signal and a second input video signal, each having a plurality of signal levels, to produce an output video signal, said apparatus comprising:

means for receiving the first and second input video signals;

analyzing means for analyzing said first input video signal to determine a distribution of the plurality of signal levels of said first input video signal;

compression function generating means for generating a compression function, comprised of a plurality of linear function elements, in accordance with said distribution; and signal compression means for compressing said second input video signal in accordance with said compression function to produce said output video signal.

28. Apparatus according to claim 27, wherein said analyzing means comprises histogram means for generating a histogram signal representative of a histogram of the plurality of signal levels of said first input video signal.

29. Apparatus according to claim 28, wherein said signal compression means compresses said second input video signal as a function of said histogram signal.

30. Apparatus according to claim 28, wherein said histogram means comprises a plurality of comparators for comparing each of the plurality of signal levels of said first input video signal to a plurality of predetermined ranges of signal levels.

31. Apparatus according to claim 30, wherein, said histogram means further comprises counting means for counting each of the plurality of signal levels of said first input video signal occurring in a predetermined range of signal levels.

* * * * *